US009595822B2

(12) United States Patent
Park et al.

(10) Patent No.: US 9,595,822 B2
(45) Date of Patent: Mar. 14, 2017

(54) REVERSE BATTERY PROTECTION DEVICE AND OPERATING METHOD THEREOF

(71) Applicant: LSIS CO., LTD., Anyang-si, Gyeonggi-do (KR)

(72) Inventors: Sung Sik Park, Cheonan-si (KR); Woo Sup Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 182 days.

(21) Appl. No.: 14/533,989

(22) Filed: Nov. 5, 2014

(65) Prior Publication Data

US 2015/0214722 A1 Jul. 30, 2015

(30) Foreign Application Priority Data

Jan. 27, 2014 (KR) ........................ 10-2014-0009700

(51) Int. Cl.

| | |
|---|---|
| ***H02H 3/00*** | (2006.01) |
| ***H02H 3/18*** | (2006.01) |
| ***H02H 11/00*** | (2006.01) |
| ***H02J 7/00*** | (2006.01) |

(52) U.S. Cl.

CPC ............ *H02H 3/18* (2013.01); *H02H 11/003* (2013.01); *H02J 7/0034* (2013.01)

(58) Field of Classification Search

CPC ........................................................ H02H 3/18
USPC ........................................................ 361/84
See application file for complete search history.

(56) References Cited

U.S. PATENT DOCUMENTS

| | | | | |
|---|---|---|---|---|
| 3,748,567 | A * | 7/1973 | Arai | H02J 7/0078 320/139 |
| 5,729,061 | A * | 3/1998 | Narita | H02H 7/18 307/116 |
| 9,239,980 | B2 * | 1/2016 | Kovacic | G06K 19/0702 |
| 2004/0066168 | A1 * | 4/2004 | George | H02J 7/0034 320/105 |
| 2007/0086224 | A1 * | 4/2007 | Phadke | H02M 3/285 363/65 |

FOREIGN PATENT DOCUMENTS

| | | |
|---|---|---|
| DE | 19941489 | 3/2001 |
| DE | 10-2011-007339 | 10/2012 |
| EP | 0874438 | 10/1998 |
| JP | 07-184318 | 7/1995 |

(Continued)

OTHER PUBLICATIONS

European Patent Office Application Serial No. 14193373.9, Search Report dated Apr. 13, 2015, 7 pages.

(Continued)

*Primary Examiner* — Stephen W Jackson
(74) *Attorney, Agent, or Firm* — Lee, Hong, Degerman, Kang & Waimey

(57) ABSTRACT

A reverse battery protection device and an operating method thereof are provided. The reverse battery protection device includes a signal generating unit measuring a voltage of a battery, and, when the measured voltage is not smaller than a reference voltage, generating an electrical signal, a signal converting unit converting the generated electrical signal into a DC voltage, and a switch unit switching to allow a current to flow between the battery and a converter, when the converted DC voltage is received.

19 Claims, 5 Drawing Sheets

130
200
110
SIGNAL GENERATING UNIT
B
300
LDC
120
A

(56) References Cited

FOREIGN PATENT DOCUMENTS

| | | |
|---|---|---|
| JP | 2004-135478 | 4/2004 |
| JP | 2007-082374 | 3/2007 |
| JP | 2013-099069 | 5/2013 |
| WO | 2010/079066 | 7/2010 |
| WO | 2011/134576 | 11/2011 |

OTHER PUBLICATIONS

Japan Patent Office Application Serial No. 2014-246832, Office Action dated Oct. 20, 2015, 3 pages.

* cited by examiner

REVERSE BATTERY PROTECTION DEVICE AND OPERATING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0009700, filed on Jan. 27, 2014, the contents of which are hereby incorporated by reference herein in its entirety.

BACKGROUND

The present disclosure relates to a reverse battery protection device and an operating method thereof, and particularly, to a reverse battery protection device in which a low voltage DC/DC converter is normally operable in a low voltage, and an operating method thereof.

Typically, an electric vehicle or a hybrid vehicle includes a high voltage battery providing a high voltage to a driving motor and a low voltage battery providing a low voltage to electronic devices.

In battery charging of the electric vehicle or the hybrid vehicle, the high voltage battery is charged through an external power source or a generator inside the vehicle and the low voltage battery is charged by converting the high voltage of the high voltage battery into the low voltage.

A device converting the high voltage into the low voltage is the low voltage DC/DC converter (hereinafter referred to as "LDC"), which converts the high voltage from the high voltage battery into the low voltage and charges the low voltage battery or delivers power to a load device.

On the other hand, the electronic devices are connected to a reverse battery protection device in order to protect the battery and a system from damages according to reverse connection of the battery.

Here, the reverse connection of the battery means that the battery is reversely, not normally, connected to a circuit.

For example, for an LDC connected to a battery and an electronic system, a reverse battery protection device is necessary for simultaneously performing a battery charging operation and a reverse connection preventing operation. Typically, a metal oxide silicon field effect transistor (MOSFET) is used as a switching device.

In detail, a reverse battery protection device using the MOSFET as the switching device may prevent reverse connection of the battery through a diode inside the MOSFET and charge the battery by allowing a channel current to flow between a source and a drain of the MOSFET A typical reverse battery protection device using a MOSFET as a switching device is described with reference to FIGS. 1 and 2.

Referring to FIG. 1, FIG. 1 illustrates a reverse battery protection device using a p-channel MOSFET.

In a circuit illustrated in FIG. 1, when a battery is normally connected to the circuit, a current flowing through a diode inside the MOSFET charges an output capacitor of an LDC.

When the output capacitor of the LDC is charged, a current flows through the LDC and accordingly the current flows the reverse battery protection device. Then a voltage is applied to a gate of the MOSFET.

According to the application of the voltage to the gate of the MOSFET, a p-channel is formed, a current flows through the formed p-channel, and the current flowing through the diode charges the battery while flowing through the channel of the MOSFET.

On the contrary, when the battery is reversely connected, a current does not flow through the diode inside the MOSFET and the output capacitor of the LDC is not charged. Then the voltage is not applied to the gate of the MOSFET and the current does not flow.

FIG. 2 illustrates a reverse battery protecting device using an N-channel MOSFET.

In a circuit illustrated in FIG. 2, when a battery is normally connected to a circuit, a current flowing through a diode inside the MOSFET charges an output capacitor of an LDC.

When the output capacitor of the LDC is charged, a current flows through the LDC and accordingly the current flows through the reverse battery protecting device. Then a voltage is applied to a gate of the MOSFET.

When the voltage is applied to the gate of the MOSFET, the N-channel is applied, and a current flows through the formed channel, a current flowing through the diode flows through the channel of the MOSFET and charges the battery.

On the contrary, when the battery is reversely connected, a current does not flow through the diode inside the MOSFET and the output capacitor of the LDC is not charged. Then a voltage is not applied to the gate of the MOSFET and the current does not flow.

In this way, since different in kind of MOSFET but same in basic operations, the reverse battery protection devices in FIGS. 1 and 2 prevent reverse connection of the battery and charge the battery.

As described above, the related art using a MOSFET as a switching device uses a scheme that a current flows through a power supply circuit and a voltage of the battery is applied to a gate of the MOSFET.

Accordingly, a gate voltage of the MOSFET is determined by a voltage of a connected battery and the gate voltage of the MOSFET is affected by a voltage variation of the battery.

When the connected battery is fully charged, a normal voltage is applied to the gate of the MOSFET. When the voltage of the battery is lowered by battery discharge or a cold crank phenomenon due to a low temperature, the gate voltage of the MOSFET is also lowered.

When the gate voltage of the MOSFET is lowered, the MOSFET does not operate in a normal operation range, and a magnitude of resistance (Rds) between a drain and a source of the MOSFET becomes large and a loss of a current flowing through the MOSFET also becomes large.

In addition, when the battery voltage becomes lowered, a current does not normally flow the reverse battery protection device and the reverse battery protection device operates unstably.

SUMMARY

Embodiments provide a reverse battery protection device capable of simultaneously performing a battery charging operation and a reverse connection preventing operation.

Embodiments also provide a reverse battery protection device capable of stably charging a battery without being affected by a variation of voltage magnitude of a connected battery.

In one embodiment, a reverse battery protection device includes: a signal generating unit measuring a voltage of a battery, and, when the measured voltage is not smaller than a reference voltage, generating an electrical signal; a signal converting unit converting the generated electrical signal into a DC voltage; and a switch unit switching to allow a current to flow between the battery and a converter, when the converted DC voltage is received.

The electrical signal may be an operation signal for switching the switch unit to allow a current to flow through the battery.

The signal converting unit may convert the received electrical signal into the DC voltage of a constant magnitude.

The reference voltage may be a voltage within a measurable range when the battery is normally connected to the reverse battery protection device.

The switch unit may include a field effect transistor (FET), and the signal converting unit may deliver the converted DC voltage to a gate terminal of the FET.

The signal converting unit may include a center-tapped full wave rectifying circuit.

The converter may include a low voltage DC/DC converter.

The electrical signal may be a pulse width modulation signal.

In another embodiment, an operating method of a reverse battery protection device, includes: measuring a voltage of a battery; comparing the measured voltage of the battery with a reference voltage; generating an electrical signal on the basis of the compared result; and performing a connecting operation between the battery and a converter charging the battery on the basis of the electrical signal.

The operating method according to claim 9, wherein the generating of the electrical signal comprises generating the electrical signal connecting the battery and the converter, when the measured voltage of the battery is not smaller than the reference voltage.

The performing of the connecting operation may include: converting the electrical signal into a DC voltage; and performing a switching operation that connects the battery and the converter on the basis of the converted DC voltage.

The generating of the electrical signal may include generating an electrical signal for disconnecting the battery from the converter, when the measured voltage of the battery is smaller than the reference voltage.

The performing of the switching operation may include performing a switching operation of disconnecting the battery from the converter on the basis of the electrical signal for disconnecting.

The details of one or more embodiments are set forth in the accompanying drawings and the description below. Other features will be apparent from the description and drawings, and from the claims.

DETAILED DESCRIPTION OF THE EMBODIMENTS

Figure 1:
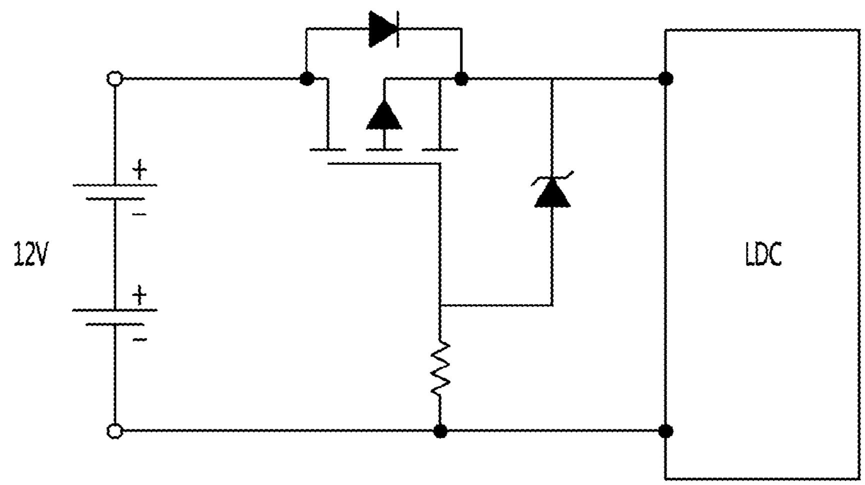
FIG. 1 illustrates a typical reverse battery connection device using a p-channel MOSFET.
Figure 2:
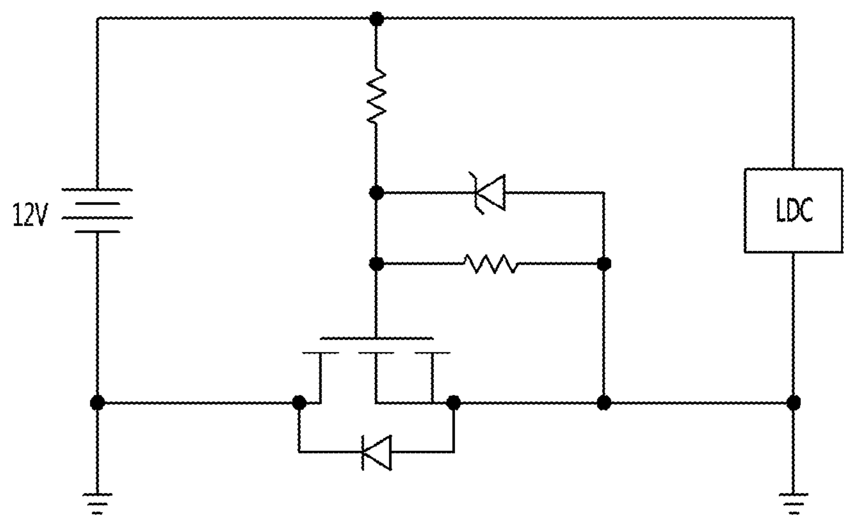
FIG. 2 illustrates a typical reverse battery connection device using an n-channel MOSFET.

Reference will now be made in detail to the embodiments of the present disclosure, examples of which are illustrated in the accompanying drawings.

A reverse battery protection device and an operating method thereof according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art. In the specification, descriptions or drawings on portions irrelative to the present invention will be omitted. Like reference numerals refer to like elements throughout.

In addition, it will be further understood that the terms “comprises” and/or “comprising” used herein specify the presence of stated features or components, but do not preclude the presence or addition of one or more other features or components.

Figure 3:
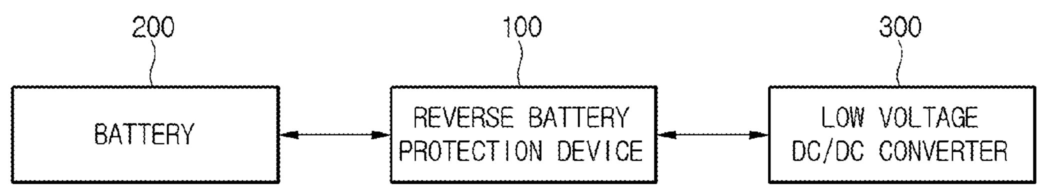
FIG. 3 illustrates a connection configuration of a reverse battery connection device according to an embodiment.

FIG. 3 illustrates a connection configuration of a reverse battery protection device 100.

The reverse battery protection device 100 is connected to a battery 200 and a low voltage DC/DC converter (LDC) 300.

Accordingly, the reverse battery protection device 100 may simultaneously perform a battery charging operation and a reverse connection preventing operation between the battery 200 and the LDC 300.

Hereinafter, description about a configuration of the reverse battery protection device 100 is provided with reference to FIG. 4.

Figure 4:
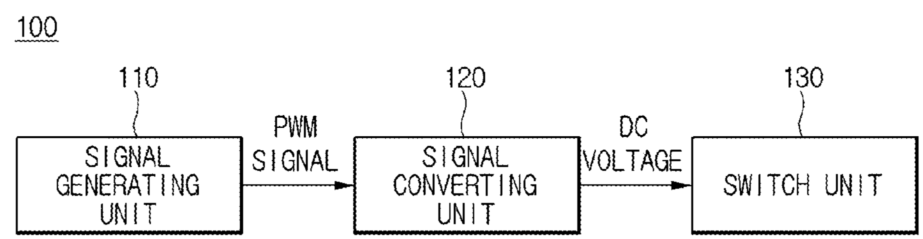
FIG. 4 is a configuration block diagram of a reverse battery protecting device according to an embodiment.

FIG. 4 is a configuration block diagram of the reverse battery protection device 100.

The reverse battery protection device 100 includes a signal generating unit 110, a signal converting unit 120, and a switch unit 130.

The signal generating unit 110 measures a voltage of a connected battery 200 and generates an electrical signal when the voltage of the battery 200 is not smaller than a reference voltage.

The electrical signal is an operation signal for switching the switch unit 130 to be described later in order to allow a current to flow through the battery 200.

In addition, the electrical signal may be a pulse width modulation (PWM) signal.

The PWM is one of schemes for converting an analog signal, which is easily damaged by noise, into a digital signal which is robust to noise.

A PWM signal and a control scheme through the PWM signal are well-known technology and description in detail about them is omitted.

The signal generating unit 110 may generate a constant electrical signal when the measured voltage of the battery 200 is not smaller than a reference voltage.

Accordingly, when the measured voltage of the battery 200 is not smaller than the reference voltage, the signal generating unit 110 may generate a constant electrical signal without being affected by a variation of a measured voltage magnitude of the battery.

The electrical signal generated by the signal generating unit 110 is delivered to the signal converting unit 120.

Furthermore, since the reference voltage may be set according to various conditions such as specification of the connected battery 200, and a determination scheme for reverse connection of the battery, when the battery 200 is normally connected, the reference voltage may be selected in various ways according to a user's selection or a designer's selection within a measurable range.

The signal converting unit 120 receives the electrical signal generated by the signal generating unit 110 and converts it into a DC voltage.

The signal converting unit 120 may output a constant DC voltage in correspondence to an input electrical signal.

The signal converting unit 120 may include a center-tapped full-wave rectifying circuit and convert the input electrical signal into a DC voltage of a constant magnitude.

Here, the center-tapped full-wave rectifying circuit is a circuit converting AC to DC and already known. Therefore, description in detail about it is omitted.

The signal converting unit 120 delivers the converted DC voltage to the switch unit 130.

The switch unit 130 may receive the DC voltage converted by the signal converting unit 120 and switch to allow the current to flow between the connected battery 200 and a converter 300.

Since the switching unit 130 includes a FET, the signal converting unit 130 may deliver the converted DC current to a gate terminal of the FET.

Here, the converter 300 is a device converting a type of a signal or energy, and refers to a device performing conversion between AC and DC, mutual conversion of AC frequencies, or constant value conversion.

In addition, the converter 300 may include the LDC.

The switch unit 130 may be disposed between the battery 200 and the converter 300.

When receiving a DC voltage within a switching operation range, the switch unit 130 may perform a switching operation allowing a current to flow between the battery 200 connected thereto and the converter 300.

Accordingly, when not receiving the DC current within the switching operation range, the switch unit 130 may switch not to allow the current to flow between the connected battery 200 and the converter 300.

Hereinafter, a reverse battery protection method is described with reference to FIGS. 5 and 6.

Figure 5:
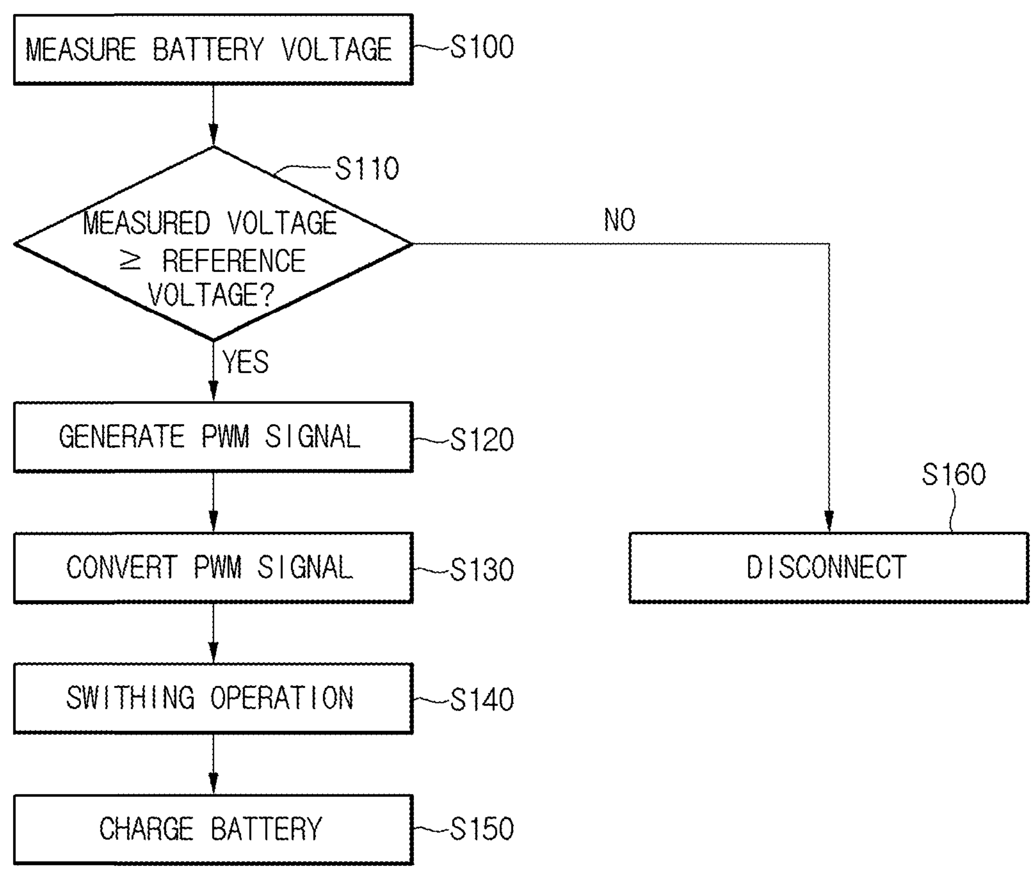
FIG. 5 is a flowchart for explaining a reverse battery protection method according to an embodiment.

FIG. 5 is a flowchart for explaining a reverse battery protection method.

Figure 6:
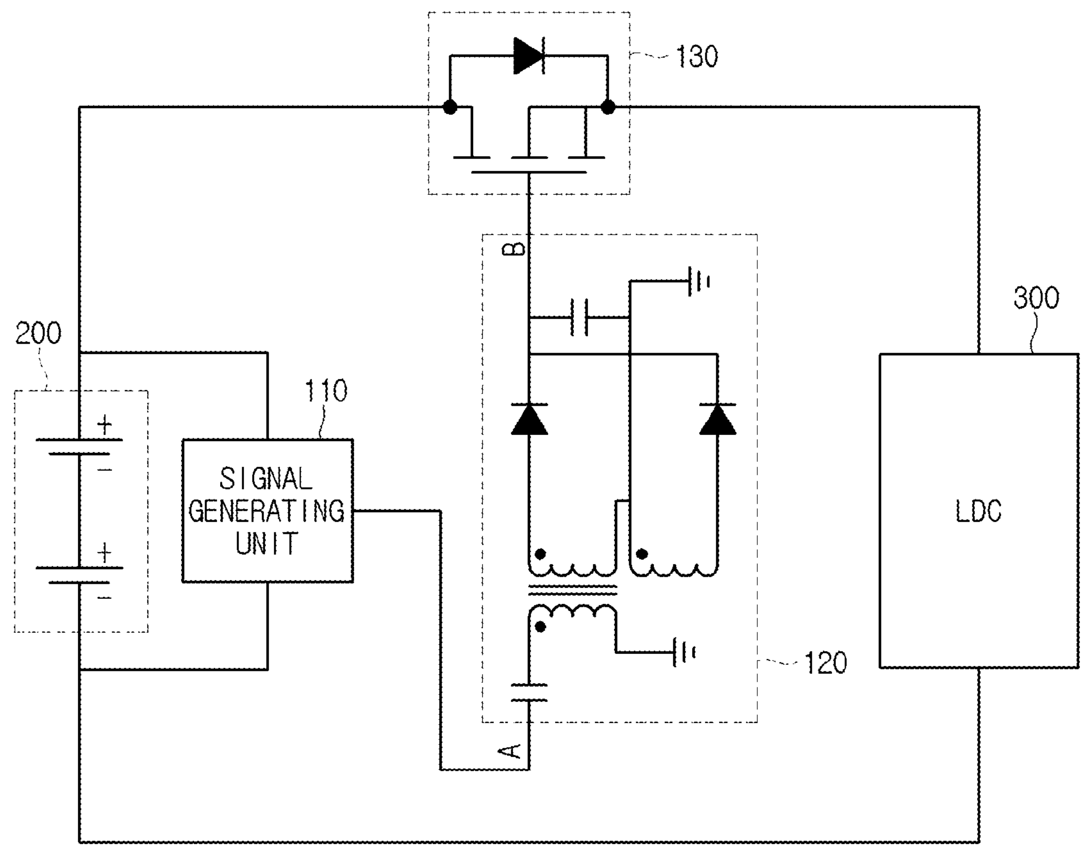
FIG. 6 is an exemplary connection configuration of a reverse battery protection device according to an embodiment.

FIG. 6 is an exemplary connection configuration of the reverse battery protecting device 100.

Referring to FIG. 6, in the reverse battery protection device 100, the signal generating unit 110 may be connected to the battery 200 in parallel and measure a voltage of the battery 200.

The signal generating unit 110 generates an electrical signal in response to the measured voltage of the battery 200 and the generated electrical signal is delivered to the signal converting unit 120.

The signal converting unit 120 converts the received electrical signal into a DC voltage of a constant magnitude, and the converted DC voltage is delivered to the switch unit 130.

The switch unit 130 performs a switching operation in response to the received DC voltage and accordingly a current flows between the battery 200 and the converter 300.

Hereinafter, a reverse battery protection method is described with reference to the flowchart of FIG. 5 and the exemplary view of FIG. 6.

The signal generating unit 110 measures a voltage of the connected battery 200 (operation S100).

The signal generating unit 110 determines whether the measured voltage of the battery 200 is not smaller than a reference voltage (operation S110).

When the measured voltage of the battery 200 is not smaller than the reference voltage, the signal generating unit generates a PWM signal (operation S120).

On the contrary, when the measured voltage of the battery 200 is smaller than the reference voltage, the signal generating unit 110 disconnects the battery 200 from the reverse battery protection device 100 (operation S160).

This is because, when the measured voltage of the battery 200 is smaller than the reference voltage, the signal generating unit may determine that the battery 200 is connected reversely, not normally.

For example, when the reference voltage is 0V and the measured voltage of the battery 200 is 12V, the signal generating unit 110 may determine that the battery 200 is normally connected and generates a PWM signal.

However, when the measured voltage of the battery 200 is −12V which is smaller than the reference voltage 0V, the signal generating unit 110 determines that the battery 200 is reversely connected and does not generate the PWM signal.

In addition, the signal generating unit 110 may disconnect the battery 200 from the reverse battery protection device 100.

When the battery 200 is reversely connected, the signal generating unit 110 does not generate the PWM signal. Accordingly, the signal converting unit does not apply a DC voltage to the switch unit 130.

For example, the signal converting unit 120 does not apply the DC voltage to the gate of the MOSFET of the switch unit 130.

Accordingly, since the switch unit 130 does not switch in a direction that a current flows through a circuit and the current does not flow through a circuit of the reverse battery protection device 100, the battery 200 may be disconnected.

The signal converting unit 120 may receive the generated PWM signal and convert the PWM signal into a DC voltage (operation S130).

The signal converting unit 120 may receive the PWM signal from the signal generating unit 110, and convert the received PWM signal into the DC voltage of a constant magnitude.

PWM signal conversion by the signal converting unit 120 is described with reference to FIG. 7.

Figure 7:
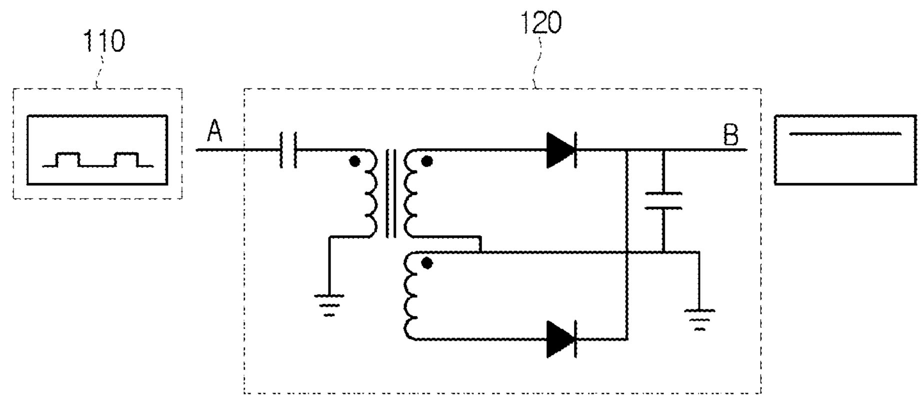
FIG. 7 illustrates a conversion of a PWM signal according to an embodiment.

FIG. 7 illustrates conversion of a PWM signal.

When the measured voltage of the battery 200 is not smaller than a reference voltage, the signal generating unit 110 generates a PWM signal and the generated PWM signal is delivered to the signal converting unit 120 through a stage A.

The signal converting unit 120 receives the PWM signal and converts the PWM signal into a DC voltage of a constant magnitude.

As illustrated in FIG. 7, the PWM signal input to the stage A passes through a transformer and is converted to have a magnitude in a certain ratio according to a transformation ratio of the transformer.

In addition, the magnitude-converted PWM signal of an AC type passes through a diode and is converted into a DC type due to a rectifying operation of the diode.

Therefore the PWM signal input to the stage A is converted into a DC voltage of a constant magnitude through the signal converting unit 120 and then output to a stage B.

For example, when a PWM signal is input to the stage A, the signal converting unit 120 may convert the input PWM signal into a DC voltage of 12V, and output the converted DC voltage of 12V through the stage B.

Here, the signal converting unit 120 may include a center-tapped full-wave rectifying circuit, and the input PWM signal may be converted into the DC voltage of the constant magnitude through the center-tapped full-wave rectifying circuit.

Furthermore, when the measured voltage of the battery 200 is not smaller than a reference voltage, since the signal generating unit 110 generates a constant PWM signal, a constant PWM signal is also input to the signal converting unit 120.

Since receiving the constant PWM signal, the signal converting unit 120 may output a DC voltage of a constant magnitude.

Therefore, the DC voltage of the constant magnitude may be output through the signal converting unit 120.

FIG. 5 is referred to again.

The switch unit 120 receives the converted DC voltage and performs a switching operation to allow a current to flow between the connected battery 200 and the converter 300 (operation S140).

The switch unit 130 may perform the switching operation in response to the DC voltage received from the signal converting unit 120.

The switch unit 130 may include a MOSFET. Accordingly when the received DC voltage is not smaller than a threshold voltage of the MOSFET, the switch unit 120 may perform a switching operation.

The switching operation of the switch unit 130 is described with reference to FIG. 8.

Figure 8:
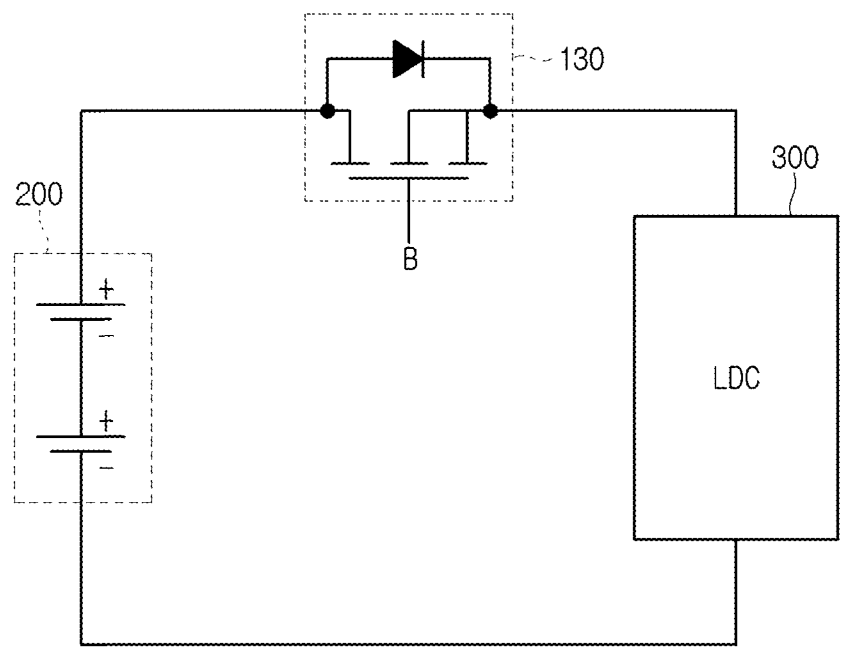
FIG. 8 illustrates a switching operation by applying a converted DC voltage according to an embodiment.

FIG. 8 illustrates that the DC voltage converted by the signal converting unit 120 is applied to the switch unit 130 and the switch unit 130 performs a switching operation.

The switch unit 130 receives the converted DC voltage from the signal converting unit 120.

For example, the DC voltage of 12V output from the state B in FIG. 7 is input to a gate stage of an N-channel MOSFET of the switch unit 130 and the gate voltage not smaller than the threshold voltage is applied to the MOSFET.

Accordingly, an N-channel is formed in the N-channel MOSFET and a current flows between the source and drain thereof.

Accordingly, a current flows through the circuit of the reverse battery protection device 100 and a current flows between the battery 200 and the LDC.

However, when the DC voltage of 12V output from the stage B in FIG. 8 is not input to the gate stage of the N-channel MOSFET of the switch unit 130, a gate voltage not smaller than the threshold voltage is not applied to the MOSFET, an N-channel is not formed in the gate stage of the N-channel MOSFET, and then a current does not flow between the source and drain thereof.

Accordingly, a current does not flow through the circuit of the reverse battery protection device 100 and a current does not flow between the battery 200 and the LDC.

On the other hand, since receiving a DC voltage of a constant magnitude converted by the signal converting unit 120, the switch unit 130 is not affected by a variation of a voltage magnitude of the battery 200.

Accordingly, the switching operation of the switch unit 130 may be performed only by the DC voltage of the constant magnitude converted by the signal converting unit 120 and is not affected by the connected battery 200.

Therefore, the switch 130 may stably perform the switching operation without being affected by a voltage variation of the connected battery 200.

For example, since receiving the gate voltage of the constant magnitude from the signal converting unit 120, the MOSFET included in the switch unit 130 may operate within a normal operation range and a magnitude of resistance between the drain and source of the MOSFET is maintained constant and loss of a current flowing through the MOSFET can be reduced.

FIG. 5 is referred to again.

According to the switching operation of the switch unit 130, a current flows between the battery 200 and the converter 300 and the battery 200 is charged (operation S150).

The switch unit 130 performs the switching operation to allow the current to flow between the battery 200 connected to the reverse battery protection device 100 and the converter 300, and the current flows between the battery 200 and the converter 300.

Accordingly, the battery 200 may be charged by the flowing current.

In this way, since the reverse battery protection device 100 and the operating method thereof according to embodiments can deliver a DC voltage of a constant magnitude to the switch unit 130 without being affected by a voltage magnitude variation of the connected battery 200, the reverse battery protection device 100 can be provided which is operable without being affected by the variation of the voltage magnitude of the battery 200.

Accordingly a switch between the battery 200 and the converter 300 can be stably operated and loss of a current flowing through the battery 200 can be reduced.

According to embodiments, a reverse battery protection device can be provided, which can perform a battery charging operation and a battery reverse connection preventing operation without being affected by a voltage magnitude variation of a battery connected to the reverse battery protecting device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reverse battery protection device comprising:

a signal generating unit measuring a voltage of a battery and generating a constant electrical signal regardless of the actual measured voltage when the measured voltage is greater than or equal to a reference voltage;

a signal converting unit converting the generated electrical signal into a DC voltage; and a switch unit allowing current to flow between the battery and a converter when the converted DC voltage is received.

2. The reverse battery protection device according to claim 1, wherein the generated electrical signal causes the switch unit to allow current to flow between the battery and the converter.

3. The reverse battery protection device according to claim 1, wherein the converted DC voltage has a constant magnitude.

4. The reverse battery protection device according to claim 1, wherein the reference voltage is a voltage within a measurable range when the battery is normally connected to the reverse battery protection device.

5. The reverse battery protection device according to claim 1, wherein:

the switch unit comprises a field effect transistor (FET); and the signal converting unit delivers the converted DC voltage to a gate terminal of the FET.

6. The reverse battery protection device according to claim 1, wherein the signal converting unit comprises a center-tapped full wave rectifying circuit.

7. The reverse battery protection device according to claim 1, wherein the converter comprises a low voltage DC/DC converter.

8. The reverse battery protection device according to claim 1, wherein the generated electrical signal is a pulse width modulation signal.

9. An operating method of a reverse battery protection device, the method comprising:

measuring a voltage of a battery;

comparing the measured voltage with a reference voltage;

generating a constant signal based the comparison; and performing a connecting operation between the battery and a converter charging the battery based on the generated electrical signal regardless of the actual measured voltage when the measured voltage is greater than or equal to a reference voltage.

10. The operating method according to claim 9, wherein the connection operation is performed when the measured voltage is greater than or equal to the reference voltage.

11. The operating method according to claim 10, wherein the connecting operation comprises:

converting the generated electrical signal into a DC voltage; and performing a switching operation that connects the battery and the converter based on the converted DC voltage.

12. The operating method according to claim 9, further comprising generating a disconnection electrical signal for disconnecting the battery from the converter when the measured voltage is smaller than the reference voltage.

13. The operating method according to claim 12, wherein the switching operation is performed based on the disconnection electrical signal.

14. The reverse battery protection device according to claim 1, wherein the signal generating unit generates a disconnection electrical signal for disconnecting the battery from the converter when the measured voltage is smaller than the reference voltage.

15. The reverse battery protection device according to claim 14, wherein the switch disconnects the battery from the converter based on the disconnection electrical signal.

16. operating method according to claim 9, wherein the connecting operation allows current to flow between the battery and the converter.

17. operating method according to claim 11, wherein the converted DC voltage has a constant magnitude.

18. operating method according to claim 9, wherein the reference voltage is a voltage within a measurable range when the battery is normally connected to the reverse battery protection device.

19. operating method according to claim 9, wherein the generated electrical signal is a pulse width modulation signal.

* * * * *